United States Patent
Xu (10) Patent No.: US 11,211,996 B2
(45) Date of Patent: Dec. 28, 2021

(54) TECHNIQUES FOR EXPANDING COMMUNICATION RANGE BETWEEN WIRELESS DEVICES

(71) Applicant: ZGMICRO NANJING LTD, Jiangsu (CN)

(72) Inventor: Bin Xu, Jiangsu (CN)

(73) Assignee: Nanjing Zgmicro Company Limited, Nanjng (CN)

( * ) Notice: Subject to any disclaimer, the term of this patent is extended or adjusted under 35 U.S.C. 154(b) by 0 days.

(21) Appl. No.: 16/847,678

(22) Filed: Apr. 14, 2020

(65) Prior Publication Data
US 2020/0252121 A1  Aug. 6, 2020

Related U.S. Application Data (63) Continuation of application No. PCT/CN2019/074304, filed on Jan. 31, 2019.

(51) Int. Cl.
*H04B 7/155* (2006.01)
*H04L 27/26* (2006.01)

(52) U.S. Cl.
CPC ....... *H04B 7/15507* (2013.01); *H04L 27/266* (2013.01); *H04L 27/2607* (2013.01);
(Continued)

(58) Field of Classification Search
CPC . H04L 1/0041; H04L 1/0045; H04L 27/2607; H04L 27/2628; H04L 27/2659;
(Continued)

(56) References Cited

U.S. PATENT DOCUMENTS

| 2002/0172263 A1* | 11/2002 | Kindred | H04W 88/02 375/132 |
| 2009/0323610 A1* | 12/2009 | Gaddam | H04W 16/10 370/329 |

(Continued)

FOREIGN PATENT DOCUMENTS

CN   1017659898   4/2013

OTHER PUBLICATIONS

Wireless Medium Access Control (MAC) and physical layer (PHY) specifications: High Speed Physical Layer in the 5 GHz band, IEEE, «IEEE Std 802. lla-1999», pp. 7, 12-13, 57 and 59-71.
(Continued)

*Primary Examiner* — Ayaz R Sheikh
*Assistant Examiner* — Debebe A Asefa
(74) *Attorney, Agent, or Firm* — Joe Zheng (57) ABSTRACT

A technique for Bluetooth wireless communication is described. According to one aspect of the technique, Bluetooth data from a data source is received in a first wireless device through an antenna and a Bluetooth radio frequency transceiver thereof via a Bluetooth connection with the data source. The Bluetooth data is used to generate a modulation signal according to a narrowband orthogonal multi-carrier modulation technology. The modulation signal is transmitted to a second wireless device through the antenna and the Bluetooth radio frequency. The antenna and the Bluetooth radio frequency transceiver are time-multiplexed by the Bluetooth connection between the first wireless device and the data source, and the wireless connection between the first wireless device and the second wireless device. The described technique can be advantageously used for expanding the distance of Bluetooth wireless propagation of Bluetooth devices.

20 Claims, 5 Drawing Sheets

(52) U.S. Cl.
CPC ...... *H04L 27/2628* (2013.01); *H04L 27/2644* (2013.01); *H04L 27/2659* (2013.01)

(58) Field of Classification Search
CPC . H04L 27/266; H04L 27/2675; H04L 27/362; H04M 1/72412; H04M 2250/02
See application file for complete search history.

(56) References Cited

U.S. PATENT DOCUMENTS

2015/0029844 A1\* 1/2015 Pathmasuntharam ...................... H04W 28/22
370/230
2017/0118315 A1\* 4/2017 Sun ......................... H04L 69/22

OTHER PUBLICATIONS

Examination of corresponding Chinese application 201810253251.9 by Chinese Patent Office dated Dec. 3, 2019.

\* cited by examiner

TECHNIQUES FOR EXPANDING COMMUNICATION RANGE BETWEEN WIRELESS DEVICES

FIELD OF THE INVENTION

The present invention relates to the field of wireless communications, and more particularly relates to Bluetooth wireless communication method, apparatus, and system.

BACKGROUND TECHNIQUE

Bluetooth products are getting popular, especially with the audio applications such as Bluetooth headsets and Bluetooth speakers with smart devices. Bluetooth is a short-distance point-to-point communication technology, and there are limits as to what this star-structured network topology can do. For example, reliable communication in further distances to share music from a smart phone in every room of the family may be handicapped.

There are many ways to extend the communication distance and range based on Bluetooth technologies, such as Bluetooth multi-hop or mesh network, and forwarding through conventional communication technologies such as Wi-Fi or WiFi. However, the distance between nodes of the Bluetooth multi-hop or mesh network is still short. Adding more nodes may extend the communication distance. After the data is forwarded multiple times, the effective bandwidth will become smaller and smaller, which cannot meet the demand of music data rate in particular. Other conventional communication technologies, such as WiFi, would complicate the underlying system and bring compatibility concerns.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of Bluetooth-related products and technologies. According to one aspect of the present, a wireless communication method, a wireless communication device, and a wireless communication system are provided for expanding the distance of Bluetooth wireless propagation of a Bluetooth device.

According to one aspect of the present invention, a method comprises: receiving Bluetooth data sent by a data source through an antenna and a Bluetooth radio frequency transceiver module of a wireless communication device via a Bluetooth connection with the data source; modulating the Bluetooth data to generate a modulation signal according to a narrowband orthogonal multi-carrier modulation technology; and transmitting the modulation signal to a data receiving device through the antenna and the Bluetooth radio frequency transceiver module of the wireless communication device via a wireless connection with the data receiving device. The antenna and the Bluetooth radio frequency transceiver module are time-multiplexed by the Bluetooth connection between the wireless communication device and the data source device, and the wireless connection between the wireless communication device and the data receiving device.

According to another aspect of the present invention, a wireless communication device includes an antenna, a Bluetooth radio frequency transceiver, a digital to analog/analog to digital converter, a modem, a Bluetooth baseband processor, and a Bluetooth protocol processor. The antenna, the Bluetooth radio frequency transceiver, the digital to analog/analog to digital converter, the modem, the Bluetooth baseband processor, and the Bluetooth protocol processor are coupled in sequence. The modem includes a Bluetooth digital modem and a narrowband orthogonal multi-carrier digital modem. The Bluetooth digital modem is configured to receive Bluetooth data sent by a data source device through the antenna and the Bluetooth radio frequency transceiver module via a Bluetooth connection with the data source device. The narrowband orthogonal multi-carrier digital modem is configured to modulate the Bluetooth data to generate a modulation signal according to a narrowband orthogonal multi-carrier modulation technology, and the modulation signal is transmitted to a data receiving device through the antenna and the Bluetooth radio frequency transceiver module via a wireless connection with the data receiving device. The antenna and the Bluetooth radio frequency transceiver module are time-multiplexed by the Bluetooth connection between the wireless communication device and the data source device, and the wireless connection between the wireless communication device and the data receiving device.

According to yet aspect of the present invention, a wireless communication system comprises: a data source device for transmitting Bluetooth data; a first wireless communication device, configured for receiving Bluetooth data transmitted by the data source device through an antenna and a Bluetooth radio frequency transceiver module thereof via a Bluetooth connection with the data source device, and performing modulation processing on the Bluetooth data to generate a modulation signal according to a narrowband orthogonal multi-carrier modulation technology, transmitting the modulation signal through the antenna and the Bluetooth radio frequency transceiver module thereof via a wireless connection with one or more second wireless communication devices; and one or more second wireless communication devices, configured for receiving the modulation signal transmitted by the first wireless communication device, performing demodulation processing on the modulation signal, and obtaining Bluetooth data from the modulation signal. The antenna and the Bluetooth radio frequency transceiver module of the first wireless communication device are time-multiplexed by the Bluetooth connection between the first wireless communication device and the data source device, and the wireless connection between the first wireless communication device and the second wireless communication devices.

The modulation signal includes a preset packet format. The preset packet format includes a short training sequence, a long training sequence, an access address, a signal domain data, and a load data domain. The short training sequence is used for automatic gain control and coarse synchronization of the data receiving device. The long training sequence is used for fine synchronization and channel estimation of the data receiving device. The access address is used to distinguish the data source device and/or the data receiving device. The signal domain data is used to transmit packet control information. The load data domain is used to transfer data.

One of the benefits, advantages and objects of the present invention is as follows: the wireless communication system in the present invention adds a modulation and demodulation technology per orthogonal multi-carrier to improve spectrum utilization and receiving sensitivity, thereby expanding the communication distance and increasing the transmission rate with the same transmission power, based on the conventional Bluetooth device which comprises the antenna, the radio frequency transceiver, the baseband processor and the protocol processor, and etc. In one embodiment, a wireless communication system is formed by such a wireless communication device, and the communication distance and communication range of the smart phone or other Bluetooth device are expanded. A wireless communication device is used as a forwarding node which receives data of a data source device, such as a smart phone, and forwards it to one or more other wireless communication devices.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the invention is presented largely in terms of procedures, operations, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
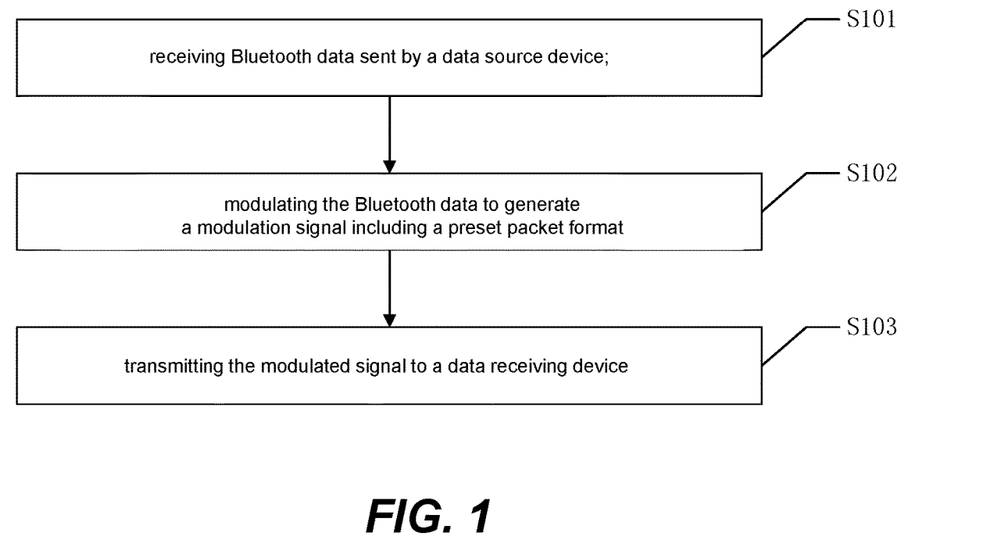
FIG. 1 is a flowchart of a wireless communication method according to one embodiment of the present invention.

Referring now to FIG. 1, it shows a flowchart or process according to one embodiment of the present invention. The process may be implemented in hardware or a combination of hardware or software and directed to communication between two devices capable of communicating in Bluetooth protocol. Examples of the devices include but may not be limited to smartphones. To facilitate the description of the present invention, one of the two devices is referred to as a transmitting device and the other one is referred to as a receiving device. Those skilled in that art understand either one of the devices is capable of receiving and transmitting signals, hence transceiving a signal. At S101, a transmitting device receives Bluetooth data from a data source (e.g., from the Internet or another device). At S102, the Bluetooth data is used in the transmitting device to generate a modulation signal including one or more preset packets. At S103, the modulation signal is transmitted to the receiving device.

In one embodiment, the process shown in FIG. 1 is used in forwarding nodes which receive original Bluetooth data sent by a data source device, and then perform modulation processing on the Bluetooth data to get a modulation signal to extend a communication distance, and send the modulation signal to the data receiving device.

Figure 2:
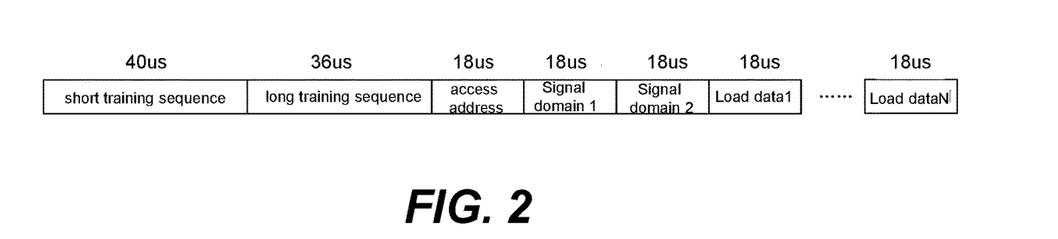
FIG. 2 is a schematic diagram of a preset packet format according to one embodiments of the present invention.

Modulating the Bluetooth data in one embodiment of the present invention adopts a coded narrowband orthogonal multi-carrier (NB-OMC: Narrow-Band Orthogonal Multi-Carrier) modulation technology, which can solve the problems of multipath interference and fading, enhance the receiving sensitivity so as to increase the communication link budget, thereby extending the communication distance between the two devices. The generated modulation signal includes a specific preset packet formatted as shown in FIG. 2. The preset packet format in the embodiment includes a short training sequence, a long training sequence, an access address, a signal domain data and a load data domain.

The short training sequence is used for automatic gain control and coarse synchronization of the receiving device. The long training sequence is used for fine synchronization and channel estimation of the receiving device. The access address is used to distinguish the data source device and/or the (data) receiving device. The signal domain data is used to transmit packet control information. The load data domain is used to transfer data. According to one embodiment, the short training sequence is 40 microseconds, the long training sequence is 36 microseconds, and each of the access address, signal domain data, and the load data domain is 18 microseconds in length.

Figure 3:
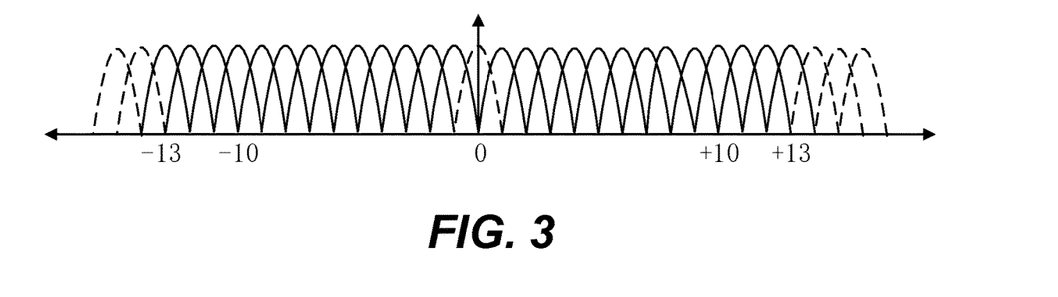
FIG. 3 is a schematic diagram of 32 orthogonal multi-carriers according to one embodiment of the present invention.

It should be noted that the narrow-band orthogonal multi-carrier modulation in one embodiment uses 32 orthogonal multi-carriers to transmit data in parallel. The 32 orthogonal multi-carriers comprise 2 pilot subcarriers, 24 data subcarriers, 1 DC subcarrier, and 5 subcarriers as guard intervals. The interval between two adjacent subcarriers is 62.5 kHz. The modulation signal occupies 1.70 MHz bandwidth approximately. The arrangement of 32 orthogonal multi-carriers is shown in FIG. 3, wherein +10 and −10 sub-carriers are pilot sequences, the sub-carriers shown by dashed lines do not modulate data, and other solid-line subcarriers are the data subcarriers used to modulate the load data. In one embodiment, the Bluetooth data sent by a data source device is filtered after being received, as a result the signal energy of some subcarriers may be attenuated. Transmitting subcarrier pre-compensation can be used to solve the attenuation problem.

The short training sequence in the preset packet format is generated as follows: performing 32 point inverse fast Fourier transform to sequence {0, 0, −1−j, 0, −1−j, 0, +1+j, 0, +1+j, 0, +1+j, 0, +1+j, 0, 0, 0, 0, 0, 0, 0, +1+j, 0, −1−j, 0, +1+j, 0, −1−j, 0, −1−j, 0, +1+j, 0} to get 32 time domain points {s0, s1, s2, . . . , s30, s31}; expanding the 32 time domain points into 80 time domain points { s16, s17, s18, . . . , s30, s31, s0, s1, s2, . . . , s30, s31, S0, s1, s2, . . . , s30, s31} by the 2.5 times cycle expansion, to obtain the short training sequence.

The long training sequence in the preset packet format is generated by: performing the 32-point inverse fast Fourier transform to sequence {0, +1, −1, +1, +1, +1, −1, −1, +1, −1, +1, +1, −1, −1, 0, 0, 0, 0, 0, +1, −1, −1, +1, +1, −1, +1, −1, +1, −1, −1, +1, +1} to get 32 time domain points {t0, t1, t2, t30, t31}; expanding the 32 time domain points into 72 time domain points { s24, s25, s26, s30, s31, t0, t1, t2, t30, t31, t0, t1, t2, t30, t31} by cycle expansion, to obtain the long training sequence.

The access address in the Bluetooth data has a field length of 48 bits. The access address is modulated into 24 complex signals according to quadrature phase shift keying (QPSK). The 24 complex signals are modulated on the 24 data subcarriers to generate the access address in the preset packet format.

Figure 4:
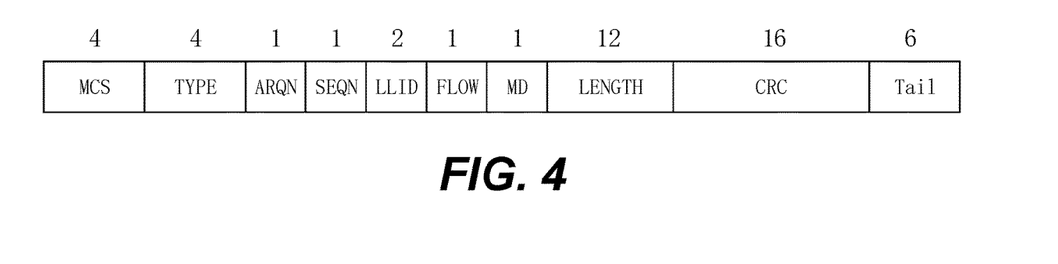
FIG. 4 is a schematic diagram of a signal domain in a preset packet format according to one embodiment of the present invention.

The field length of the signal domain data in the Bluetooth data is 48 bits in total, as shown in FIG. 4. The signal domain data including 4-bit modulation coding rate (MCS), 4-bit packet type (TYPE), 1-bit automatic retransmission flag (ARQN), 1 Bit Sequence Number (SEQN), 2-bit Logical Link Indication (LLID), 1-bit Flow Control Flag (FLOW), 1-bit Subsequent Data Indication (MD), 12-bit load data length (LENGTH), 16-bit cyclic redundancy check bits (CRC) and 6-bit convolutional coding trailing bits.

The 48-bit signal domain data after whitened is error correction coded to get 96 bits converted signal domain data. The 96 bits converted signal domain data is interleaved and quadrature phase modulated into 48 complex signals. The 48 complex signals are divided into two groups, which are modulated on 24 data subcarriers of signal domain 1 and 24 data subcarriers of signal domain 2 respectively to get the signal domain data in the preset packet format.

The load data in the Bluetooth data after whitened (whitening process) is error correction coded, interleaved, and quadrature phase or quadrature amplitude modulated sequentially to get modulated complex signals. The modulated complex signals are grouped, each group contains 24 complex signals. Each group is modulated on the 24 data subcarriers to generate the load data in the preset packet format.

After the access address, the signal domain data, and the load data are modulated on the 24 data subcarriers, two pilot signals are inserted at positions of +10 and −10 subcarriers shown in FIG. 3, and other subcarriers are set to 0. Then, the 32-point time domain signal {x0, x1, x2, . . . , x30, x31} is obtained by 32-point inverse fast Fourier transform. The 32-point time domain signal is cyclically expand into 36 points {x28, x29, x30, x31, x0, x1, x2, . . . , x30, x31} by adding a cyclic prefix.

Through the above process, the short training sequence, the long training sequence, the access address, the signal domain data 1, the signal domain data 2, and the load data 1 to N are obtained respectively. The time interval of each sampling point is 0.5 microseconds. These time domain sampling points are then oversampled to adjust the sampling rate of the time domain signal to a preset sampling rate.

In addition, after the data receiving device receives the modulation signal, the data receiving device performs demodulation process on the modulation signal to obtain original Bluetooth data from the preset packet format. The demodulation process is opposite to the modulation process, and is known to those skilled in the art according to the above mentioned modulation process, so it is not described here. After the data receiving device receives the modulation signal, the short training sequence obtained by demodulating the modulation signal is used to control the receiving gain of the data receiving device.

Figure 5:
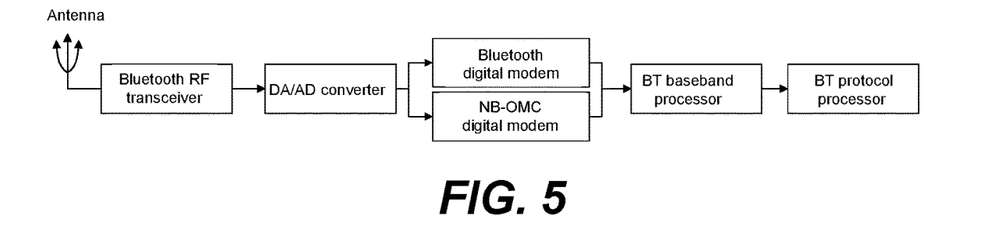
FIG. 5 is a schematic diagram of a wireless communication device according to one embodiment of the present invention.

Referring to FIG. 5, it shows a functional block diagram of a wireless communication device according to one embodiment of the present invention. The wireless communication device includes an antenna, a Bluetooth radio frequency (RF) transceiver, a digital-to-analog/analog-to-digital (DA/AD) converter, a modem, a Bluetooth (BT) baseband processor, and a Bluetooth protocol processor. The modem includes a Bluetooth digital modem and a narrowband orthogonal multi-carrier digital modem. The Bluetooth digital modem is configured to receive Bluetooth data sent by a data source device.

The narrowband orthogonal multi-carrier digital modem is configured to perform modulation processing on the Bluetooth data sent by the data source device to generate a modulation signal, and send the modulation signal to a data receiving device, or configured to receive the modulation signal, and demodulates the modulation signal. The modulation signal includes a preset packet format.

According to one embodiment, a wireless communication device may be viewed to include a Bluetooth transceiver and a NB-OMC (Narrow-Band Orthogonal Multi-Carrier) transceiver. The Bluetooth transceiver includes an antenna, a Bluetooth RF transceiver, a digital-to-analog/analog-to-digital converter, a Bluetooth digital modem, a Bluetooth baseband processor and a Bluetooth protocol processor. The NB-OMC transceiver includes an antenna, a Bluetooth RF transceiver, a DA/AD converter, an NB-OMC digital modem, a Bluetooth baseband processor and a Bluetooth protocol processor. In one embodiment, the Bluetooth transceiver and the NB-OMC transceiver share the same antenna, the same Bluetooth radio transceiver module, the same DA/AD converter, the same Bluetooth baseband processor, and the same Bluetooth protocol processor. Thus, the NB-OMC digital modem is added on the conventional Bluetooth transceiver, without adding much cost and power consumption. Only new NB-OMC digital modulation functions and NB-OMC digital demodulation functions are added, as well as related support protocols. From the hardware perspective, the power consumption and the cost brought by the added digital circuits is negligible relative to the power consumption and the cost brought by the added analog circuits such as RF circuit and memories.

The NB-OMC digital modem includes a NB-OMC digital modulator and an NB-OMC digital demodulator. The NB-OMC digital modulator is configured to modulate a signal sent by the Bluetooth baseband processor and send the modulation signal to the DA/AD converter. The NB-OMC digital demodulator is configured to demodulate the signal sent by the DA/AD converter and send the demodulation signal to the Bluetooth baseband processor.

Figure 6:
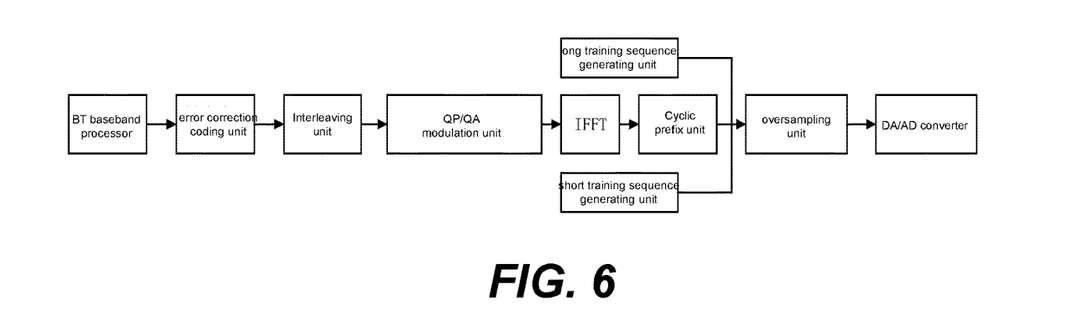
FIG. 6 is a schematic diagram of a NB-OMC digital modulator according to one embodiment of the present invention.

Specifically, as shown in FIG. 6, the NB-OMC digital modulator includes a short training sequence generating unit, a long training sequence generating unit, an error correction coding unit, an interleaving unit, a quadrature phase (QP)/quadrature amplitude modulation (QA) unit, an inverse fast Fourier transform (IFFT) unit, a cyclic prefix unit, and an oversampling unit.

The error correction coding unit receives a signal transmitted by the Bluetooth baseband processor. The error correction coding unit, the interleaving unit, the QP/QA modulation unit, the inverse fast Fourier transform unit, the cyclic prefix unit, and the oversampling unit are connected in sequence. The short training sequence generating unit generates a short training sequence for automatic gain control and coarse synchronization and transmits the short training sequence to the oversampling unit. The long training sequence generating unit generates a long training sequence for fine synchronization and channel estimation and transmits the long training sequence to the oversampling unit. The oversampling unit outputs a digital modulation signal to the DA/AD converter.

Figure 7:
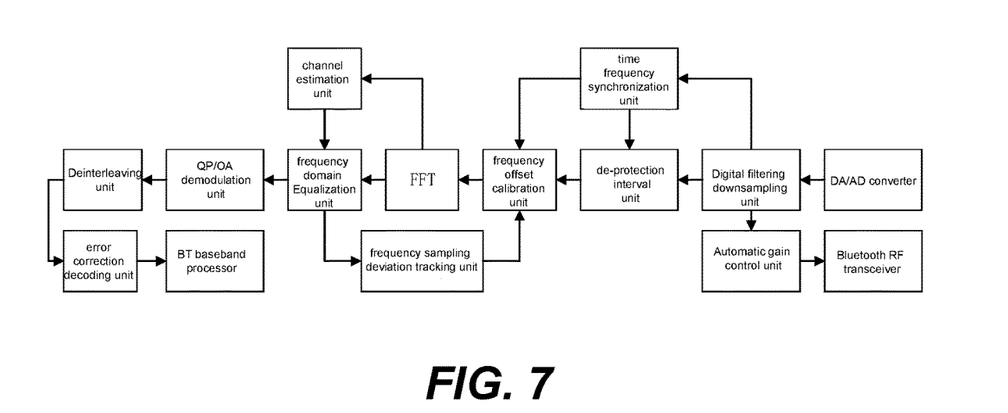
FIG. 7 is a schematic diagram of a NB-OMC digital demodulator according to one embodiment of the present invention.

As shown in FIG. 7, the NB-OMC digital demodulator includes a digital filtering downsampling unit, a de-protection interval unit, a frequency offset calibration unit, a fast Fourier transform unit, a frequency domain equalization unit, and a quadrature phase (QP)/quadrature amplitude (QA) demodulation unit, a deinterleaving unit, an error correction decoding unit, a time frequency synchronization unit, a channel estimation unit, and a frequency sampling deviation tracking unit.

The digital filtering downsampling unit receives a signal transmitted by the DA/AD converter. The digital filtering downsampling unit, the de-protection interval unit, the frequency offset calibration unit, the fast Fourier transform unit, the frequency domain equalization unit, and the QP/QA demodulation unit, the deinterleaving unit, and the error correction decoding unit are connected in sequence.

The fast Fourier transform unit, the channel estimation unit, and the frequency domain equalization unit are connected in sequence. The frequency domain equalization unit, the frequency sampling deviation tracking unit and the frequency offset calibration unit are connected in sequence. The digital filtering downsampling unit is connected to the time frequency synchronization unit, and the time frequency synchronization unit is connected to the frequency offset calibration unit and the deprotection interval unit respectively. The error correction decoding unit transmits error correction decoded signal to the Bluetooth baseband processor.

A packet format of the modulation signal of the NB-OMC digital modem according to one embodiment of the present invention is as shown in FIG. 2, and comprises a short training sequence, a long training sequence, an access address, a signal domain data, and a load data domain. The short training sequence is used for automatic gain control and coarse synchronization of the data receiving device. The long training sequence is used for fine synchronization and channel estimation of the data receiving device. The access address is used to distinguish the data source device and/or the data receiving device. The signal domain data is used to transmit packet control information. The load data domain is used to transfer data. The short training sequence is 40 microseconds, the long training sequence is 36 microseconds, each of the access address, signal domain data, and the load data domain is 18 microseconds in length.

When the wireless communication device transmits a signal, the NB-OMC digital modulator generates and transmits the short training sequence, the long training sequence, the access signal domain, and the load data signal in sequence. When receiving the signal, the NB-OMC digital demodulator receives the short training sequence firstly to adjust a receive gain of the RF receiver automatically.

Specifically, the NB-OMC digital demodulator further includes an automatic gain control unit. The automatic gain control unit receives a signal sent by the digital filtering downsampling unit and controls the receive gain of the Bluetooth radio transceiver according to intensity of the signal.

Depending on specific implementation, the NB-OMC digital modem in the wireless communication device according to one embodiment uses 32 orthogonal multi-carriers to transmit data in parallel. The 32 orthogonal multicarrier comprises 2 pilot subcarriers, 24 data subcarriers, 1 DC subcarrier, and 5 subcarriers as guard intervals. The interval between two adjacent subcarriers is 62.5 kHz. The modulation signal occupies 1.70 MHz bandwidth approximately. The arrangement of 32 orthogonal multi-carriers is as shown in FIG. 3, there are 32 sub-carriers in total, wherein +10 and −10 sub-carriers are pilot sequences, the sub-carriers shown by dashed lines do not modulate data, and other solid-line subcarriers are the data subcarriers used to modulate the load data. After filtering by an analog filter of the Bluetooth radio transceiver, the signal energy of some subcarriers may be attenuated. Transmitting subcarrier pre-compensation can be used to solve the attenuation problem.

The short training sequence in the NB-OMC packet format shown in FIG. 2 is generated as follows: performing 32 point inverse fast Fourier transform to sequence {0, 0, −1−j, 0, −1−j, 0, +1+j, 0, +1+j, 0, +1+j, 0, +1+j, 0, 0, 0, 0, 0, 0, 0, +1+j, 0, −1−j, 0, +1+j, 0, −1−j, 0, −1−j, 0, +1+j, 0} to get 32 time domain points {s0, s1, s2, s30, s31}; expanding the 32 time domain points into 80 time domain points { s16, s17, s18, s30, s31, s0, s1, s2, s30, s31, S0, s1, s2, s30, s31} by the 2.5 times cycle expansion, to obtain the short training sequence.

The long training sequence in the NB-OMC packet format shown in FIG. 2 is generated by: performing the 32-point inverse fast Fourier transform to sequence {0, +1, −1, +1, +1, +1, −1, −1, +1, −1, +1, +1, −1, −1, 0, 0, 0, 0, 0, +1, −1, −1, +1, +1, −1, +1, −1, +1, −1, −1, +1, +1} to get 32 time domain points {t0, t1, t2, t30, t31}; expanding the 32 time domain points into 72 time domain points { s24, s25, s26, s30, s31, t0, t1, t2, t30, t31, t0, t1, t2, . . . , t30, t31} by cycle expansion, to obtain the long training sequence.

The access address in the NB-OMC packet format shown in FIG. 2 is 48 bits, and is modulated into 24 complex signals by QPSK (Quadrature Phase). The 24 complex signals are modulated on the 24 data subcarriers as shown in FIG. 5.

The signal domain data in the NB-OMC packet format shown in FIG. 2 is as shown in FIG. 4, a total of 48 bits. The signal domain data including 4-bit modulation coding rate (MCS), 4-bit packet type (TYPE), 1-bit automatic retransmission flag (ARQN), 1 Bit Sequence Number (SEQN), 2-bit Logical Link Indication (LLID), 1-bit Flow Control Flag (FLOW), 1-bit Subsequent Data Indication (MD), 12-bit load data length (LENGTH), 16-bit cyclic redundancy check bits (CRC) and 6-bit convolutional coding trailing bits.

The 48-bit signal domain data whitened by the Bluetooth baseband processor is sent to the NB-OMC digital modulator. The error correction coding unit processes the 48-bit signal domain data to get 96 bits converted signal domain data. The 96 bits converted signal domain data is interleaved by the interleaving unit and QPSK modulated by the QP/QA modulation unit into 48 complex signals. The 48 complex signals are divided into two groups, which are respectively modulated on 24 data subcarriers of signal domain 1 and 24 data subcarriers of signal domain 2.

The load data whitened by the Bluetooth baseband processor is sent to the NB-OMC digital modulator. The load data is error correction coded, interleaved, and QP/QA modulated in sequence into complex signals. The modulated complex signals are grouped and each group comprising 24 complex signals. Each group is modulated on the 24 data subcarriers to generate the load data in the preset packet format.

After the access address, the signal domain data, and the load data are modulated in 24 data subcarriers, two pilot signals are inserted at the positions of the +10 and −10 subcarriers shown in FIG. 3, and the other subcarriers are set as 0. Then, the 32-point time domain signal {x0, x1, x2, . . . , x30, x31} is obtained through the 32-point inverse fast Fourier transform. The 32-point time domain signal is expanded into 36 points {x28, x29, x30, x31, x0, x1, x2, . . . , x30, x31} by adding the cyclic prefix.

Through the above process, the short training sequence, the long training sequence, the access address, the signal domain data 1, the signal domain data 2, and the load data 1 to N are obtained respectively, and the time interval of each sampling point is 0.5 microseconds. Then, the time domain sampling points are oversampled to adjust the sampling rate of the time domain signal to the same sampling rate as the Bluetooth DA converter. For example, 12 times oversampling to 24 MHz sampling rate. Finally, the oversampling signal is sent to the DA/AD converter to be converted into an analog signal. Then, the analog signal is modulated by the Bluetooth radio frequency transceiver onto the 2.4 GHz carrier, and transmitted to the data receiving device through the antenna.

Figure 8:
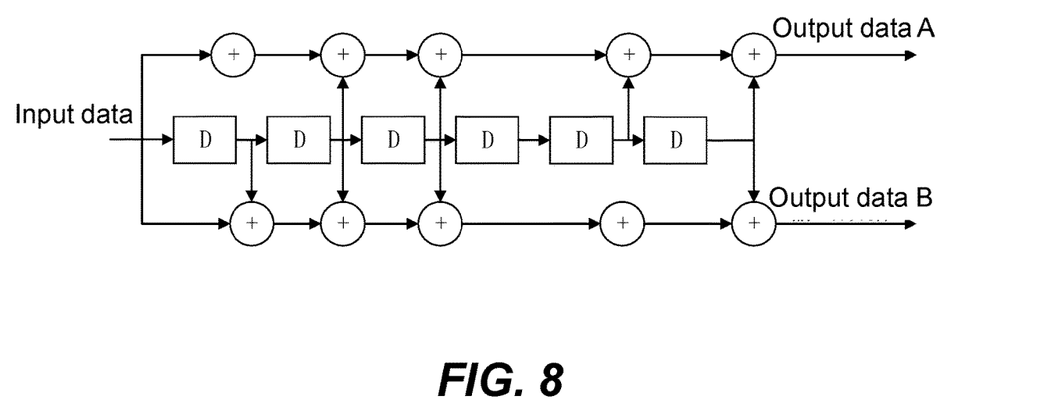
FIG. 8 is a schematic diagram of an error correction coding unit according to one embodiment of the present invention.

The error correction coding unit in the NB-OMC digital modulator adopts a convolutional encoder having two coding rates of 1/2 and 3/4. The convolutional encoder is shown in FIG. 8. The constraint length is 7, and the polynomial is got as follows:

$$G_0(x)=1+x2+x3+x5+x6$$

$$G_1(x)=1+x+x2x3+x6$$

Figure 9:
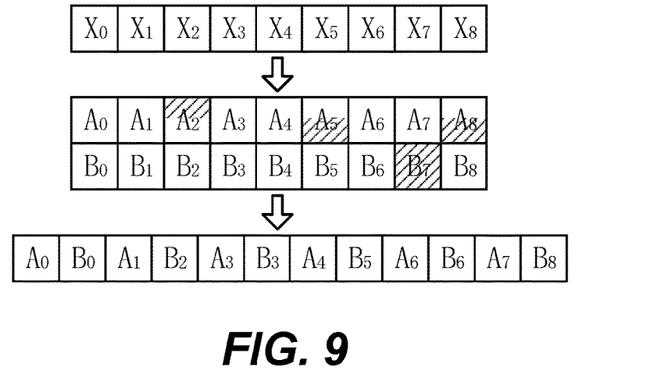
FIG. 9 is a schematic diagram of a 3/4 encoding rate according to one embodiment of the present invention.

In the convolutional encoder in FIG. 8, the encoded data A is always output before the encoded data B. The 3/4 encoding rate is achieved by puncturing the 1/2 encoding rate, as shown in FIG. 9. In the encoded data, the shaded portion is discarded before being sent, and only the punctured data is sent.

The modulation coding set supported by the NB-OMC digital modem according to one embodiment of the present invention is shown in Table 1:

TABLE 1

| MCS number | modulation mode | coding rate | N_CBPS | N_DBPS | data rate |
|---|---|---|---|---|---|
| 0 | QPSK | 1/2 | 48 | 24 | 1.33 Mbps |
| 1 | QPSK | 3/4 | 48 | 36 | 2 Mbps |
| 2 | 16QAM | 1/2 | 96 | 48 | 2.67 Mbps |
| 3 | 16QAM | 3/4 | 96 | 72 | 4 Mbps |

Figure 10:
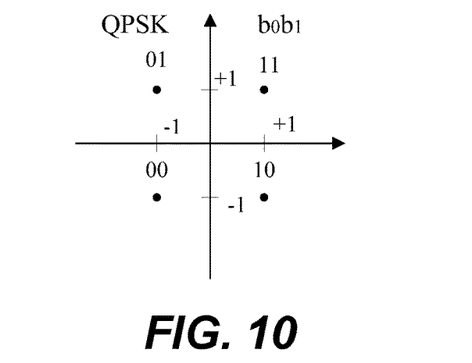
FIG. 10 is a schematic diagram of a QPSK modulation format according to one embodiment of the present invention.
Figure 11:
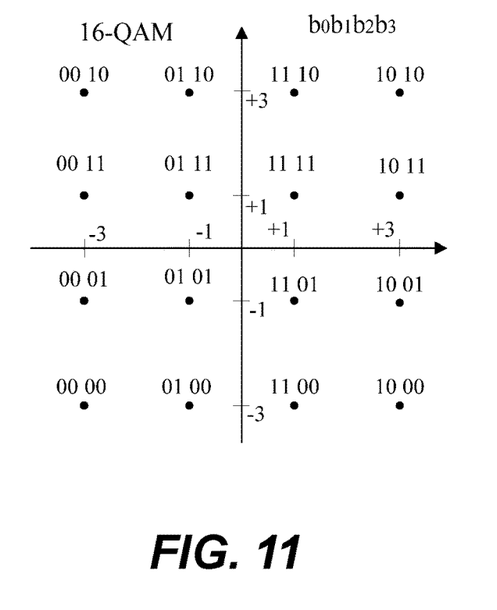
FIG. 11 is a schematic diagram of a 16QAM modulation format according to one embodiment of the present invention.

The NB-OMC digital modem supports two modulations of QPSK and 16 QAM, two encoding rates of 1/2 and 3/4, and four modulation and coding combinations, four transmission rates of 1.33 Mbps, 2 Mbps, 2.67 Mbps and 4 Mbps. In Table 1, N_CBPS represents the bit number of coded data transmitted in each NB-OMC symbol, and the N_CBPS represents the bit number of pre-coded data transmitted in each NB-OMC symbol. The QPSK and 16 QAM modulation formats are shown in FIG. 10 and FIG. 11, respectively.

The interleaving unit in the NB-OMC digital modulator according to one embodiment scrambles the encoded bit sequence so that adjacent coded bits are not modulated on adjacent subcarriers, nor are modulated at the same point in QPSK/QAM modulation. In this way, the interleaving is divided into two steps:

In the first step, k is set to be the number of the coded bit, and the bit number after the first interleaving is i, then the interleaving method is as follows:

$$i(N_{CBPS}/8)*(k\%8)+\text{floor}(k/8)$$

where % represents modulo operation and floor(x) is the largest integer not greater than x.

In the second step, the bit number after the second interleaving is set to j, then the calculation of j is as follows:

$$j=s*\text{floor}(i/s)+(i+N_{CBPS}-\text{floor}(8*i/N_{CBPS}))\%s$$

where s=1 in QPSK modulation, s=2 in 16 QAM modulation.

Figure 12:
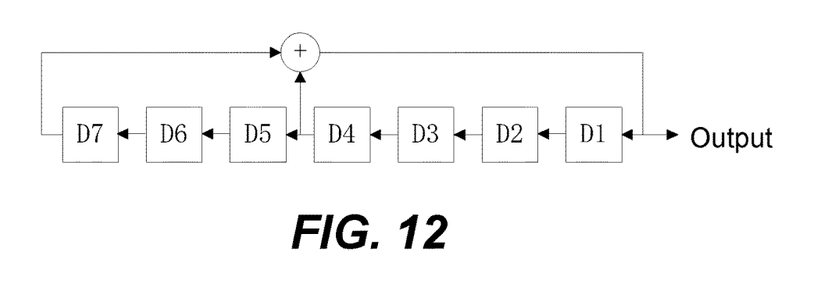
FIG. 12 is a schematic diagram of a scrambling code generator according to one embodiment of the present invention.

The +10 and −10 subcarrier modulation pilot sequences are shown in FIG. 3. The pilot sequence of the +10 subcarrier is generated according to a pseudo-random sequence with a period of 127 generated by the scrambling code generator shown in FIG. 12 being initialized as all 1, where 1 in the pseudo-random sequence has been replaced by −1, and 0 in the pseudo-random sequence has been replaced by +1. The pilot sequence of the −10 subcarrier is generated according to a pseudo-random sequence with a period of 127 generated by the scrambling code generator, shown in FIG. 12, being initialized as all 1, where the 1 in the pseudo-random sequence has been replaced by +1, and 0 in the pseudo-random sequence has been replaced by −1.

Figure 13:
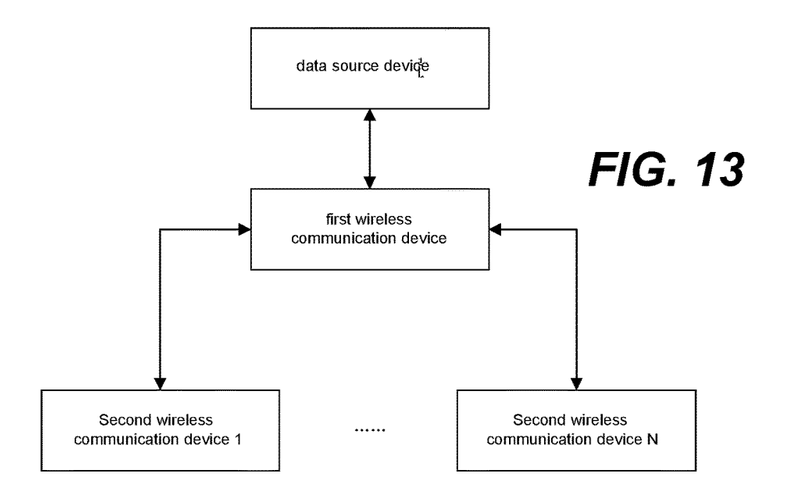
FIG. 13 is a schematic diagram of a wireless communication system according to one embodiment of the present invention.

Referring now to FIG. 13, a wireless communication system is provided in one embodiment of the present invention. The wireless communication system includes a data source device for providing Bluetooth data, a first wireless communication device configured for receiving the Bluetooth data transmitted from the data source device and performing modulation processing on the Bluetooth data to generate a modulation signal including a preset packet format, and one or more second wireless communication devices configured for receiving the modulation signal transmitted by the first wireless communication device, performing demodulation processing on the modulation signal, and obtaining Bluetooth data in the preset packet format. As described above, the preset packet format includes a short training sequence, a long training sequence, an access address, a signal domain data, and a load data domain. The short training sequence is used for automatic gain control and coarse synchronization of the second wireless communication device. The long training sequence is used for fine synchronization and channel estimation of the second wireless communication device. The access address is used to distinguish the data source device and/or the second wireless communication device. The signal domain data is used to transmit packet control information, and the load data domain is used to transfer data. It shall be understood that either the first wireless communication device or the second wireless communication device can serve as a forwarding node.

Figure 14:
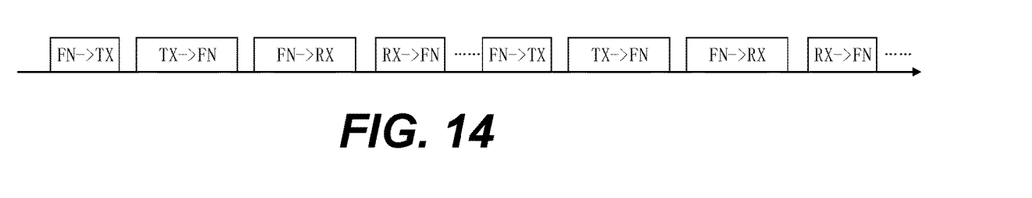
FIG. 14 is a schematic diagram of one link situation between a data forwarding node and a data receiving device.
Figure 15:
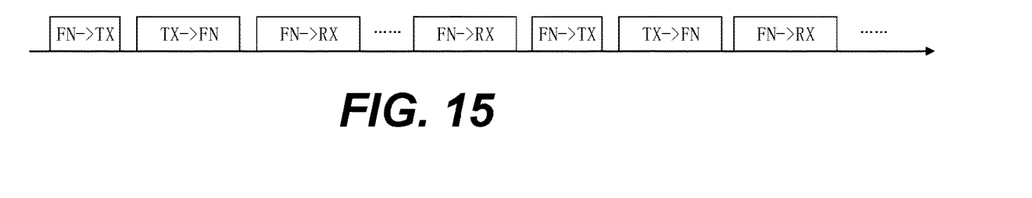
FIG. 15 is a schematic diagram of another link situation between the data forwarding node and the data receiving device in one embodiment.

The data source device in the wireless communication system may be a conventional Bluetooth device. Any one of the wireless communication devices can function as a data forwarding node, and other wireless communication devices serve as data receiving devices. The data forwarding node establishes a Bluetooth connection with the data source device through the Bluetooth transceiver, and the data source device sends the data to the data forwarding node. The data forwarding node then establishes a connection with the NB-OMC transceiver in the wireless communication device as the data receiving device through the NB-OMC transceiver, and forwards the data to other wireless communication devices. The communication between the data forwarding node and the data source device, the data receiving device adopts a time division multiplexing manner, as shown in FIGS. 14 and 15. FN represents the data forwarding node, TX represents the data source device, and RX represents the wireless communication device as the data receiving device. FIG. 14 shows an interactive link between the data forwarding node and the data receiving device. FIG. 15 shows a broadcast link between the data forwarding node and the data receiving device. There is only the data transmission direction from FN to RX, and no reverse connection from RX to FN.

Those skilled in the art should be aware that the embodiments of this application may be methods, systems, or computer program products. Accordingly, the present application may take the form of a complete hardware embodiment, a complete software embodiment, or an embodiment in conjunction with software and hardware aspects. Furthermore, the present application may take the form of a computer program product implemented on one or more computer-available storage media (including, but not limited to, disk memory, CD-ROM, optical memory, etc.) containing computer-available program code.

The present application is described with reference to methods, equipment (systems), and flow charts and/or block diagrams of computer program products according to the embodiment of the present application. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer including an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present application have been described, additional changes and modifications to these embodiments may be made once the basic creative concepts are known to those skilled in the art. The appended claims are therefore intended to be interpreted to include preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to include these changes and variations.

The invention claimed is:

1. A method for extending a Bluetooth communication distance, the method comprising:
receiving Bluetooth data from a data source device through an antenna and a Bluetooth radio frequency transceiver of a wireless communication device via a Bluetooth connection with the data source;
modulating the Bluetooth data in the wireless communication device to generate a modulation signal according to according to a preset packet format, wherein the modulation signal avoids multipath interference and fading, enhances receiving sensitivity so as to increase a communication link budget; and
transmitting the modulation signal to a data receiving device beyond the Bluetooth communication distance defined by the Bluetooth standard through the antenna and the Bluetooth radio frequency transceiver via a wireless connection, wherein the antenna and the Bluetooth radio frequency transceiver are time-multiplexed by the Bluetooth connection between the wireless communication device and the data source and the wireless connection between the wireless communication device and the data receiving device.

2. The method according to claim 1, wherein the preset packet format includes a short training sequence, a long training sequence, an access address, a signal domain data, and a load data domain, wherein the short training sequence is used for automatic gain control and coarse synchronization of the data receiving device, the long training sequence is used for fine synchronization and channel estimation of the data receiving device, the access address is used to distinguish the data source and/or the data receiving device, the signal domain data is used to transmit packet control information, and the load data domain is used to transfer data.

3. The method according to claim 2, wherein the preset packet format further includes 32 orthogonal multicarrier, and the 32 orthogonal multicarrier comprises 2 pilot subcarriers, 24 data subcarriers, one DC subcarrier, and five subcarriers as guard intervals, the interval between two adjacent subcarriers is 62.5 kHz.

4. The method according to claim 3, further comprising obtaining the short training sequence in the preset packet format, wherein said obtaining the short training sequence in the preset packet format comprises:
performing 32 point inverse fast Fourier transform to sequence {0, 0, −1−j, 0, −1−j, 0, +1+j, 0, +1+j, 0, +1+j, 0, +1+j, 0, 0, 0, 0, 0, 0, 0, +1+j, 0, −1−j, 0, +1+j, 0, −1−j, 0, −1−j, 0, +1+j, 0} to get 32 time domain points {s0, s1, s2, . . . , s30, s31}; and
expanding the 32 time domain points into 80 time domain points {s16, s17, s18, . . . , s30, s31, s0, s1, s2, . . . , s30, s31, S0, s1, s2, . . . , s30, s31} by 2.5 times cycle expansion, to obtain the short training sequence.

5. The method according to claim 3, further comprising obtaining the short training sequence in the preset packet format, wherein said obtaining the short training sequence in the preset packet format comprises:
performing the 32-point inverse fast Fourier transform to sequence {0, +1, −1, +1, +1, +1, −1, −1, +1, −1, +1, +1, −1, −1, 0, 0, 0, 0, 0, +1, −1, −1, +1, +1, −1, +1, −1, +1, −1, −1, +1, +1} to get 32 time domain points {t0, t1, t2, . . . , t30, t31}; and
expanding the 32 time domain points into 72 time domain points {s24, s25, s26, . . . , s30, s31, t0, t1, t2, . . . , t30, t31, t0, t1, t2, . . . , t30, t31} by cycle expansion, to obtain the long training sequence.

6. The method according to claim 3, further comprising obtaining the short training sequence in the preset packet format, wherein said obtaining the short training sequence in the preset packet format comprises:
modulating the access address having a field length of 48 bits in the Bluetooth data into 24 complex signals, and
modulating the 24 complex signals on the 24 data subcarriers to generate the access address in the preset packet format.

7. The method according to claim 3, further comprising obtaining the short training sequence in the preset packet format, wherein said obtaining the short training sequence in the preset packet format comprises:
performing error correction coding on the signal domain data with a field length of 48 bits in the Bluetooth data to convert the field length to 96 bits;
interleaving and modulating the converted signal domain data with a field length of 96 bits to generate 48 complex signals; and
dividing the 48 complex signals into two groups and modulating the two groups respectively on the 24 data subcarriers to generate the signal domain data in the preset packet format.

8. The method according to claim 3, further comprising obtaining the short training sequence in the preset packet format, wherein said obtaining the short training sequence in the preset packet format comprises:
performing error correction coding, interleaving and modulation on the load data in the Bluetooth data to generate complex signals;
grouping the complex signals, each group comprising 24 complex signals; and
modulating each group on the 24 data subcarriers to generate the load data in the preset packet format.

9. The method according to claim 3, further comprising:
inserting one pilot signal on each of the two pilot subcarriers, and setting the 24 data subcarriers, one DC subcarrier, and the five subcarriers as guard intervals to zero to generate a first modulation signal;
performing 32-point inverse fast Fourier transform to the first modulation signal to obtain 32-point time domain signal;
adding a cyclic prefix to the 32-point time domain signal to cyclically expand into 36 points {x28, x29, x30, x31, x0, x1, x2, . . . , x30, x31} as time domain sampling points; and
adjusting a sampling rate of the 32-point time domain signal corresponding to the 36 time domain sampling points to a preset sampling rate after over sampling.

10. A device for extending a Bluetooth communication distance, the device comprising:
an antenna;
a Bluetooth radio frequency transceiver;
a digital to analog/analog to digital converter (DAC/ADC);
a modem;
a Bluetooth baseband processor;
a Bluetooth protocol processor, wherein the modem includes a Bluetooth digital modem and a narrowband orthogonal multi-carrier digital modem, the Bluetooth digital modem is configured to receive Bluetooth data sent by a data source through the antenna and the Bluetooth radio frequency transceiver the narrowband orthogonal multi-carrier digital modem is provided to modulate the Bluetooth data to generate a modulation signal according to a preset packet format to avoid multipath interference and fading, enhance receiving sensitivity so as to increase a communication link budget, and the modulation signal is transmitted to a data receiving device beyond the Bluetooth communication distance defined by the Bluetooth standard through the antenna and the Bluetooth radio frequency transceiver, and
wherein the antenna and the Bluetooth radio frequency transceiver are time-multiplexed by the Bluetooth connection between the wireless communication device and the data source, and the wireless connection between the wireless communication device and the data receiving device.

11. The wireless communication device according to claim 10, wherein the preset packet format includes a short training sequence, a long training sequence, an access address, a signal domain data, and a load data domain, wherein the short training sequence is used for automatic gain control and coarse synchronization of the data receiving device, the long training sequence is used for fine synchronization and channel estimation of the data receiving device, the access address is used to distinguish the data source and/or the data receiving device, the signal domain data is used to transmit packet control information, the load data domain is used to transfer data.

12. The wireless communication device according to claim 10, wherein the preset packet format includes 32 orthogonal multicarrier, and the 32 orthogonal multicarrier comprises 2 pilot subcarriers, 24 data subcarriers, one DC subcarrier, and five subcarriers as guard intervals, the interval between two adjacent subcarriers is 62.5 kHz.

13. The wireless communication device according to claim 12, wherein the narrowband orthogonal multi-carrier digital modem includes operations of:

obtaining the short training sequence in the preset packet format comprises:

performing 32 point inverse fast Fourier transform to sequence {0, 0, −1−j, 0, −1−j, 0, +1+j, 0, +1+j, 0, +1+j, 0, +1+j, 0, 0, 0, 0, 0, 0, +1+j, 0, −1−j, 0, +1+j, 0, −1−j, 0, −1−j, 0, +1+j, 0} to get 32 time domain points {s0, s1, s2, . . . , s30, s31}; and expanding the 32 time domain points into 80 time domain points {s16, s17, s18, . . . , s30, s31, s0, s1, s2, . . . , s30, s31, S0, s1, s2, . . . , s30, s31} by 2.5 times cycle expansion, to obtain the short training sequence.

14. The wireless communication device according to claim 12, wherein the narrowband orthogonal multi-carrier digital modem includes operations of:

performing the 32-point inverse fast Fourier transform to sequence {0, +1, −1, +1, +1, +1, −1, −1, +1, −1, +1, +1, −1, −1, 0, 0, 0, 0, +1, −1, −1, +1, +1, −1, +1, −1, +1, −1, −1, +1, +1} to get 32 time domain points {t0, t1, t2, . . . , t30, t31}; and expanding the 32 time domain points into 72 time domain points {s24, s25, s26, . . . , s30, s31, t0, t1, t2, . . . , t30, t31, t0, t1, t2, . . . , t30, t31} by cycle expansion, to obtain the long training sequence.

15. The wireless communication device according to claim 12, wherein the narrowband orthogonal multi-carrier digital modem includes operations of:

modulating the access address having a field length of 48 bits in the Bluetooth data into 24 complex signals, and modulating the 24 complex signals on the 24 data subcarriers to generate the access address in the preset packet format.

16. The wireless communication device according to claim 12, wherein the narrowband orthogonal multi-carrier digital modem includes operations of:

performing error correction coding on the signal domain data with a field length of 48 bits in the Bluetooth data to convert the field length to 96 bits;

interleaving and modulating the converted signal domain data with a field length of 96 bits to generate 48 complex signals; and dividing the 48 complex signals into two groups and modulating the two groups respectively on the 24 data subcarriers to generate the signal domain data in the preset packet format.

17. The wireless communication device according to claim 12, wherein the narrowband orthogonal multi-carrier digital modem includes operations of:

performing error correction coding, interleaving and modulation on the load data in the Bluetooth data to generate complex signals;

grouping the complex signals, each group comprising 24 complex signals;

modulating each group on the 24 data subcarriers to generate the load data in the preset packet format.

18. The wireless communication device according to claim 12, wherein the narrowband orthogonal multi-carrier digital modem is configured to further perform:

inserting one pilot signal on each of the two pilot subcarriers, and setting the 24 data subcarriers, one DC subcarrier, and the five subcarriers as guard intervals to zero to generate a first modulation signal;

performing 32-point inverse fast Fourier transform to the first modulation signal to obtain 32-point time domain signal;

adding a cyclic prefix to the 32-point time domain signal to cyclically expand into 36 points {x28, x29, x30, x31, x0, x1, x2, . . . , x30, x31} as time domain sampling points;

adjusting a sampling rate of the 32-point time domain signal corresponding to the 36 time domain sampling points to a preset sampling rate after over sampling.

19. A system for wireless communication, the system comprising:

a data source for transmitting Bluetooth data;

a first wireless communication device, configured for receiving Bluetooth data transmitted by the data source through an antenna and a Bluetooth radio frequency transceiver thereof via a Bluetooth connection with the data source, and performing modulation processing on the Bluetooth data to generate a modulation signal according to a preset packet format to avoid multipath interference and fading, enhance receiving sensitivity so as to increase a communication link budget, transmitting the modulation signal beyond the Bluetooth communication distance defined by the Bluetooth standard through the antenna and the Bluetooth radio frequency transceiver thereof via a wireless connection with one or more second wireless communication devices; and one or more second wireless communication devices, configured for receiving the modulation signal transmitted by the first wireless communication device, performing demodulation processing on the modulation signal, and obtaining Bluetooth data from the modulation signal;

wherein the antenna and the Bluetooth radio frequency transceiver of the first wireless communication device are time-multiplexed by the Bluetooth connection between the first wireless communication device and the data source, and the wireless connection between the first wireless communication device and the second wireless communication devices.

20. The wireless communication device according to claim 19, wherein the preset packet format includes a short training sequence, a long training sequence, an access address, a signal domain data, and a load data domain;

the short training sequence is used for automatic gain control and coarse synchronization of the second wireless communication device;

the long training sequence is used for fine synchronization and channel estimation of the second wireless communication device;

the access address is used to distinguish the data source and/or the second wireless communication device;

the signal domain data is used to transmit packet control information; and the load data domain is used to transfer data.

* * * * *